United States Patent
Cheng

(10) Patent No.: US 11,564,185 B2
(45) Date of Patent: Jan. 24, 2023

(54) PRECISE TIME SYNCHRONIZATION FOR 4G AUTOMATIC LINK ESTABLISHMENT (ALE) STATIONS

(71) Applicant: Rockwell Collins, Inc., Cedar Rapids, IA (US)

(72) Inventor: Ho Ting Cheng, Stittsville (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 26 days.

(21) Appl. No.: 17/220,281

(22) Filed: Apr. 1, 2021

(65) Prior Publication Data

US 2021/0329573 A1   Oct. 21, 2021

Related U.S. Application Data

(60) Provisional application No. 63/011,881, filed on Apr. 17, 2020.

(51) Int. Cl.
*H04W 56/00* (2009.01)
*H04B 7/185* (2006.01)

(52) U.S. Cl.
CPC ...... *H04W 56/001* (2013.01); *H04B 7/18513* (2013.01)

(58) Field of Classification Search
CPC .......... H04W 56/001; H04W 56/0015; H04W 84/06; H04W 88/16; H04B 7/18513; H04B 7/185; H04B 7/2125; G01S 5/0244; G01S 19/02
See application file for complete search history.

(56) References Cited

U.S. PATENT DOCUMENTS

| | | | |
|---|---|---|---|
| 3,932,847 A | 1/1976 | Smith | |
| 5,504,878 A | 4/1996 | Coscarella et al. | |
| 5,859,595 A | 1/1999 | Yost | |
| 7,145,837 B2 | 12/2006 | Herring et al. | |
| 7,512,826 B2 | 3/2009 | Armstrong et al. | |
| 7,617,410 B2 | 11/2009 | Check et al. | |
| 8,132,038 B2 | 3/2012 | Dahlen et al. | |
| 8,438,415 B2 | 5/2013 | Engler et al. | |
| 10,116,382 B1 * | 10/2018 | Thommana | H04B 7/22 |

(Continued)

OTHER PUBLICATIONS

Department of Defense Interface Standard, MIL-STD-188-141D, "Inoperability and Performance Standards for Medium and High Frequency Radio Systems", Appendix G, Dec. 27, 2011, pp. 344-350.

(Continued)

*Primary Examiner* — Fred A Casca
(74) *Attorney, Agent, or Firm* — Suiter Swantz pc llo

(57) ABSTRACT

A control station for a fourth-generation (4G) automatic link establishment (ALE) network is disclosed. In embodiments, the control station is GPS-enabled or has a comparable precise timing source for generating timing information including the minute, second, and millisecond a protocol data unit (PDU) is to begin. The control station has a transceiver assembly for encoding the millisecond data and embedding the encoded millisecond data (as well as the minute and second data) within a Time-of-Day (TOD) Response or comparable time broadcast PDU. The PDU is transmitted to unsynchronized nodes of the 4G ALE network allowing for more precise time synchronization to the control station.

11 Claims, 4 Drawing Sheets

(56) References Cited

U.S. PATENT DOCUMENTS

| | | | |
|---|---|---|---|
| 2005/0107041 A1 | 5/2005 | Eder | |
| 2006/0248235 A1* | 11/2006 | Eyer | G11B 27/034 |
| | | | 710/1 |
| 2014/0169199 A1* | 6/2014 | Lamy-Bergot | H04W 28/24 |
| | | | 370/252 |
| 2014/0355504 A1* | 12/2014 | Du | H04W 52/0216 |
| | | | 370/311 |
| 2019/0158204 A1 | 5/2019 | Luo et al. | |

OTHER PUBLICATIONS

Johnson, Eric E, "Wideband Ale—The Next Generation of HF", Presented at the 2016 Nordic HF Radio Conference HF '16, Aug. 2016, Faro, Sweden, 18 pages.

Johnson, E. (2006). HF Radio Mesh Networks. MILCOM 2006—2006 IEEE Military Communications conference, 1-5.

Search Report for European Application No. 21168639.9 dated Oct. 12, 2021, 14 pages.

* cited by examiner

300

|  | 7 | 6 | 5 | 4 | 3 | 2 | 1 | 0 |
|---|---|---|---|---|---|---|---|---|
|  | 0 | 1 | 1 | 1 | 0 | 1 | \multicolumn{2}{c|}{VM} |
|  | 0 | 0 | 0 | 0 | 0 | 0 | \multicolumn{2}{c|}{EC} |

| | | |
|---|---|---|
| 302 → Caller Address | MSB - - - - - - | |
| | - - - - - - - LSB | |
| 304 → Responder Address | MSB - - - - - - | |
| | - - - - - - - LSB | |
| 306 → Sync Offset | TQ \| 0 0 0 0 \| Sign | |
| | Magnitude | ← 308a |
| 308 → Coarse Time | 0 0 \| Minutes | |
| | 0 0 \| ~~Seconds~~ | ← 308b |
| 310 → CRC | - - - - - - - MSB | |
| | LSB - - - - - - - | |

300a

|  | 7 | 6 | 5 | 4 | 3 | 2 | 1 | 0 |
|---|---|---|---|---|---|---|---|---|
| 312 → | 0 | 1 | 1 | 1 | 0 | 1 | \multicolumn{2}{c|}{VM} |
|  | M | S | C | O | D | E | \multicolumn{2}{c|}{EC} ← 314 |

| | |
|---|---|
| Caller Address | MSB - - - - - - |
| | - - - - - - - LSB |
| Responder Address | MSB - - - - - - |
| | - - - - - - - LSB |
| Sync Offset | TQ \| 0 0 0 0 \| Sign |
| | Magnitude |
| Coarse Time | 0 0 \| Minutes |
| | 0 0 \| Seconds |
| CRC | - - - - - - - MSB |
| | LSB - - - - - - - |

*FIG. 3*

PRECISE TIME SYNCHRONIZATION FOR 4G AUTOMATIC LINK ESTABLISHMENT (ALE) STATIONS

CROSS-REFERENCE TO RELATED APPLICATIONS

The present application is related to and claims the benefit of the earliest available effective filing dates from the following listed applications (the "Related applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related applications).

RELATED APPLICATIONS

U.S. Provisional Patent Application Ser. No. 63/011,881 entitled PRECISE TIME SYNCHRONIZATION FOR 4G AUTOMATIC LINK ESTABLISHMENT (ALE) STATIONS, filed Apr. 17, 2020;

Said U.S. Provisional Patent Application 63/011,881 is herein incorporated by reference in its entirety.

TECHNICAL FIELD

The subject matter disclosed herein is directed generally to fourth-generation (4G) automatic link establishment (ALE) communications systems and more particularly to time synchronization for unsynchronized 4G ALE stations.

BACKGROUND

Interoperability and performance standards for medium- and high-frequency (MF, HF) radio systems, particularly those radio systems compatible with fourth generation (4G) automatic link establishment (ALE) networks (e.g., Wideband ALE or WALE) provide for time synchronization among the nodes or stations of a 4G ALE network via time broadcast. However, the current time-broadcast approach does not correctly provide unsynchronized stations with millisecond-precise timing information.

SUMMARY

In one aspect, a communications node for a fourth generation (4G) automatic link establishment (ALE) network is disclosed. In embodiments, the communications node includes a precise timing source for generating precise timing information including millisecond data as well as minute and second data. The communications node includes a high frequency (HF-band; e.g., 2-30 MHz) transmitter configured for encoding the millisecond data and embedding the encoded millisecond data in a 4G ALE-compatible protocol data unit (PDU). The transmitter sends the PDU including the encoded millisecond data to unsynchronized nodes within the 4G ALE network.

In some embodiments, the precise timing source is an atomic clock.

In some embodiments, the precise timing source is a global navigation satellite system (GNSS) or other satellite-based position receiver capable of generating absolute timing information based on received satellite signals.

In some embodiments, the timing information is based on a relative time.

In some embodiments, the 4G ALE-compatible PDU is a time-of-day response (TOD RESP) PDU.

In some embodiments, the communications node is a vehicle or other mobile platform, or carried as a mobile manpack.

In another aspect, a method for precise time synchronization in a 4G ALE network is also disclosed. In embodiments, the method includes generating, via a participating unit (PU) of the 4G ALE network, precise timing information including minute data, second data, and millisecond data. The method includes encoding the millisecond data. The method includes embedding the encoded millisecond data in otherwise unused fields of a 4G ALE compatible protocol data unit (PDU). The method includes transmitting the 4G ALE compatible PDU to unsynchronized nodes of the 4G ALE network.

In some embodiments, the method includes generating precise time information via signals received via a satellite-based absolute position receiver.

In some embodiments, the method includes generating precise time information via an atomic clock.

In some embodiments, the method includes generating precise timing information based on a relative time at the PU.

In some embodiments, the method includes embedding the encoded millisecond data in a time-of-day response (TOD RESP) PDU.

In some embodiments, the method includes relaying the 4G ALE-compatible PDU to an unsynchronized PU or unsynchronized node of the network.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3 is a diagrammatic illustration of a protocol data unit (PDU) of the ALE network of FIG. 1;

DETAILED DESCRIPTION

Figure 1:
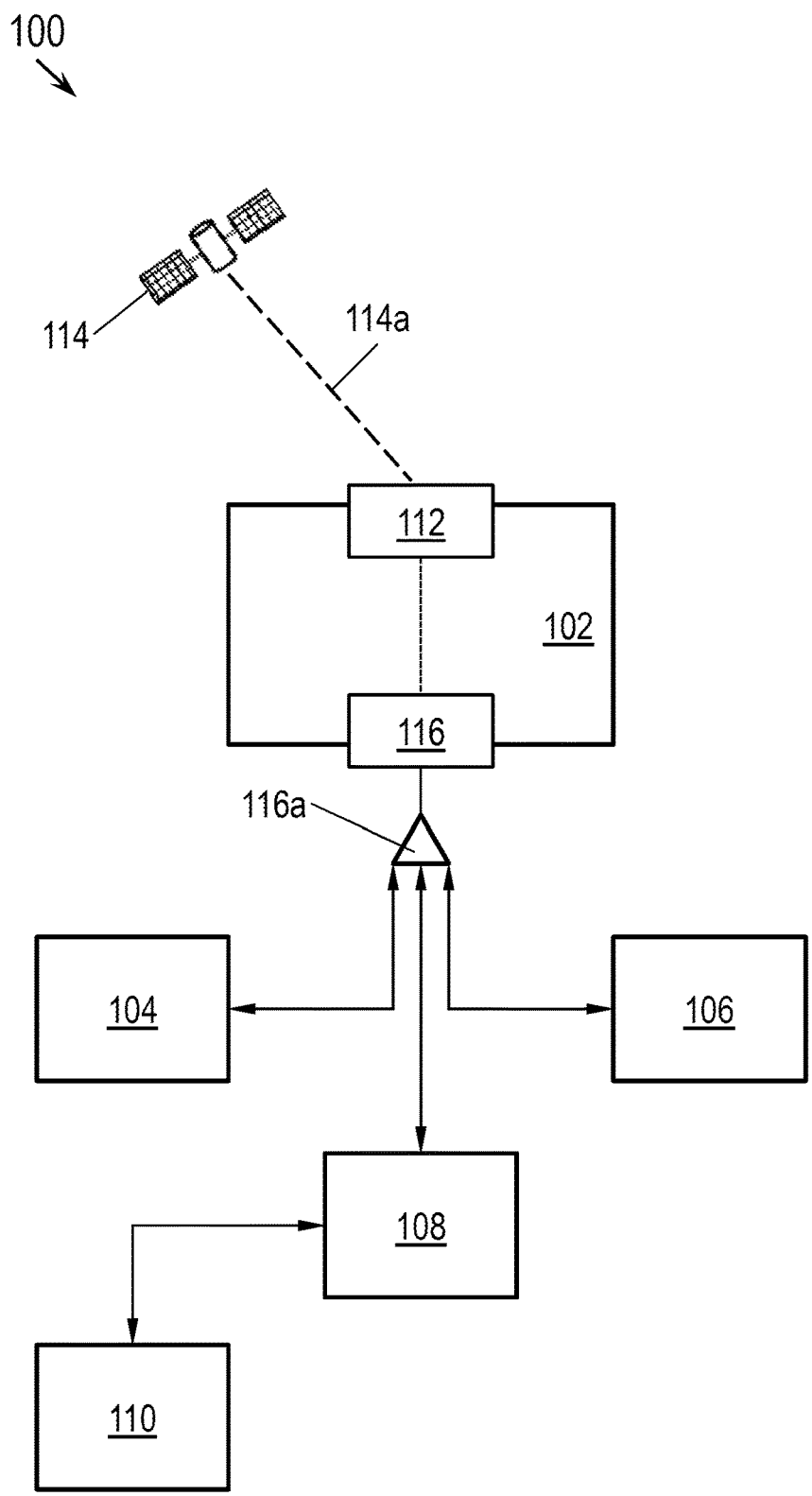
FIG. 1 is a block diagram illustrating a fourth generation (4G) automatic link establishment (ALE) network in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a fourth-generation (4G) automatic link establishment (ALE) network 100 is disclosed. The 4G ALE network 100 may include a network control station 102 (NCS) and participating units 104, 106, 108, 110 (PU; e.g., nodes, stations).

In embodiments, the NCS 102 may generate precise timing information and broadcast that timing information to PUs 104, 106, 108, 110, including millisecond data within its time broadcast transmissions to allow the unsynchronized stations to more precisely synchronize themselves to the NCS 102. For example, MIL-STD-188-141D outlines United States military standards regarding the interoperability and performance of medium-frequency (MF) and high-frequency (HF; e.g., transmitting and receiving in the frequency range from 2 to 30 MHz) radio systems. These standards include prescribed waveforms, signal structures, protocols, and performance requirements for 4G ALE or Wideband ALE (WALE) systems.

In embodiments, the NCS 102 may be a master node of the 4G ALE network 100, in that the NCS may incorporate more precise timing equipment relative to the PUs 104, 106, 108, 110. For example, the NCS 102 (as well as the PUs 104, 106, 108, 110) may be embodied in fixed-location ground-based control stations or facilities, or they may be embodied in mobile platforms (e.g., ground-based, airborne, or waterborne vehicles). In some embodiments, one or more of the NCS 102 and the PUs 104, 106, 108, 110 may be embodied in a manpack, e.g., a portable radio system carried by an individual.

In embodiments, the NCS 102 may include a precise timing source 112 capable of generating precise, reliable timing information. For example, the precise timing source 112 may include a satellite-based position receiver in communication with one or more navigational satellites 114 or satellite constellations (e.g., GPS, GNSS, GLONASS, Compass, Beidou) capable of determining absolute time based on received satellite signals 114a. In some embodiments, the precise timing source 112 may include an atomic clock fully contained or integrated within the NCS 102.

At points, one or more PUs 104, 106, 108, 110 and/or the NCS 102 may pass through a GPS-denied area, e.g., where received satellite signals 114a are unable to penetrate or absolute timing information cannot be determined. In some embodiments, the precise timing source 112 may generate relative timing information based on a relative, rather than absolute, time, synchronizing the PUs 104, 106, 108, 110 to the relative time until absolute timing information is again available.

In embodiments, the PUs 104, 106, 108, 110 may synchronize themselves to the absolute time via time broadcasts received from the NCS 102 (e.g., via NCS transceiver 116 and antenna elements 116a). For example, an unsynchronized PU 104 may request a precise time of day (TOD) by transmitting a TOD Request. An undirected TOD Request may be implicitly addressed to the NCS 102, while a directed TOD Request may be explicitly addressed to a particular NCS, PU, or station. In response to the TOD Request, the NCS 102 may transmit a TOD Response including a coarse time (e.g., in minutes and seconds) and incorporating within the protocol data unit (PDU; e.g., message format) of the TOD Response encoded millisecond data (e.g., the precise millisecond within the indicated second (per the coarse time) when the TOD Response PDU will begin). The receiving unsynchronized PU 104 may use the received TOD, adjusting for propagation delay between itself and the responding NCS 102.

In some embodiments, the PU 110 may synchronize itself to the absolute time via a TOD Response PDU received by another PU (e.g., the PU 108) and relayed to the PU 110 (e.g., in response to a TOD Request transmitted by the PU 110).

Figure 2:
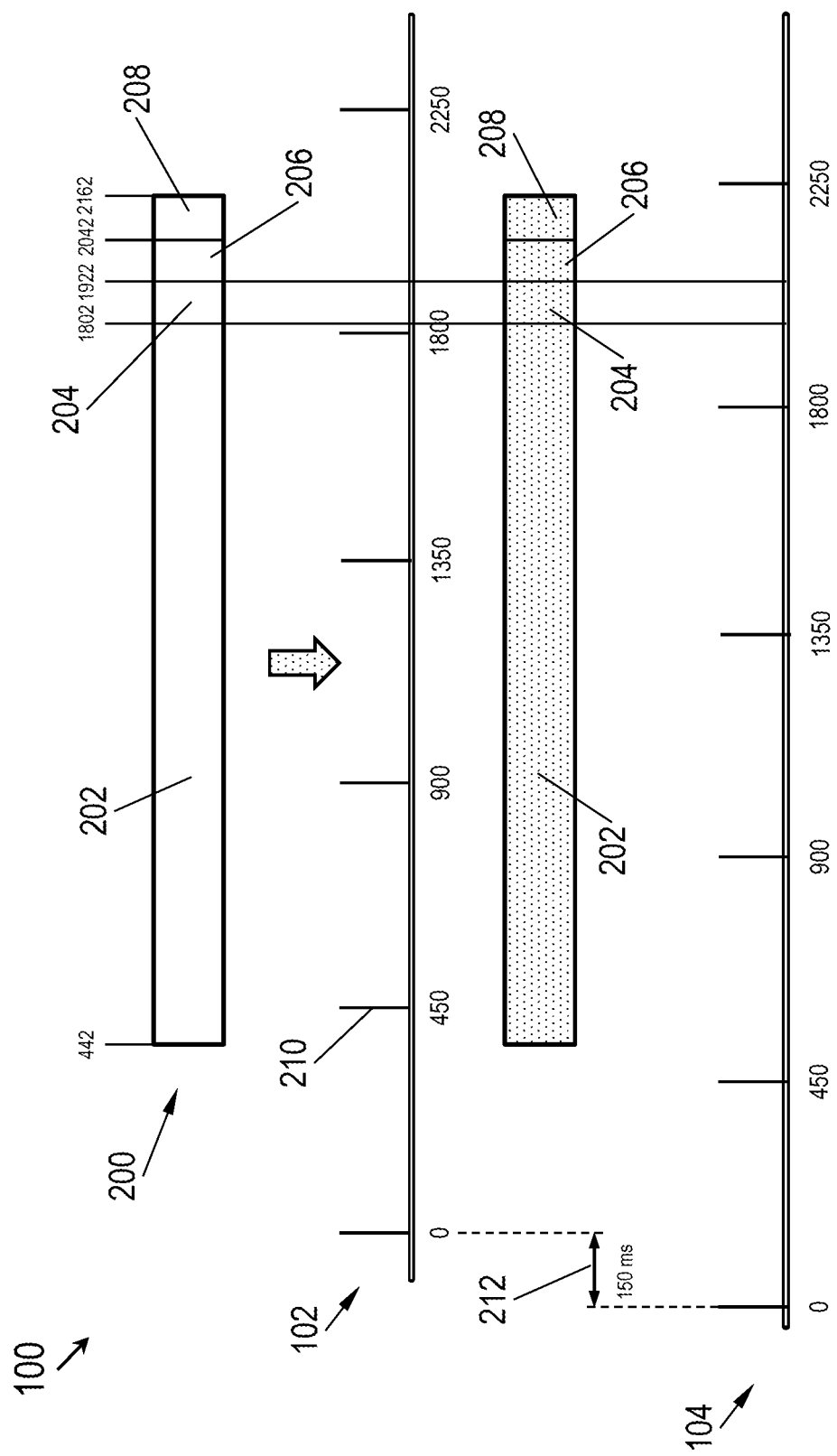
FIG. 2 is a diagrammatic illustration of time synchronization operations of the ALE network of FIG. 1.

Referring now to FIG. 2, the 4G ALE network 100 is disclosed. The 4G ALE network may incorporate over-the-air transmissions 200 (including capture probes 202, preamble 204, time-of-day (TOD) request 206, and TOD response 208) and a synchronous dwell time 210 (D) of 450 ms between slots.

In embodiments, the capture probe 202, preamble 204, TOD request 206, and TOD response 208 may all have a duration (e.g., 1360 ms, 120 ms, 120 ms, and 120 ms respectively; these durations may vary depending on the waveform used (e.g., DeepWALE vs. FastWALE)). In embodiments, the 4G ALE network may assume zero propagation delay ($T_{prop}$) between the NCS 102 and the PU 104. Further, the time at the PU 104, which is not GPS-enabled, may be 150 milliseconds (ms) ahead of the time at the NCS 102. For example, even if $T_{ReqSlotLate}$, the time difference between the start of a slot (e.g., synchronous dwell time 210) at the requesting PU 104 and the start of a slot at the responding NCS 102, is zero, there remains a timing uncertainty 212 of 150 ms between the PU and the NCS.

Referring to FIG. 3, a protocol data unit 300 (PDU) of the TOD response (208, FIG. 2) is shown. The PDU 300 may include caller address field 302, responder address field 304, synchronization offset (sync offset) data 306, coarse time data 308, and cyclic redundancy check (CRC) field 310.

In embodiments, the NCS (102, FIG. 2) may determine precise timing information including coarse time data 308 (e.g., the minute 308a in the hour when the PDU 300 will begin and the second 308b within the minute 308a when the PDU will begin) and millisecond data, e.g., the millisecond within the second 308b when the PDU will begin. The NCS 102 may encode the millisecond data and embed this encoded information within the PDU 300, such that any timing difference between a receiving PU (104, FIG. 2) and the NCS may be due solely to propagation delay, time estimation error, or quantization error rather than the timing uncertainty (212, FIG. 2). By way of a non-limiting example, the NCS 102 may represent the millisecond data millisec in N-bit millisecond code (MsCode) as $$MsCode = round(millisec/msRes)$$

where $msRes = 1000.0/pow(2,N)$ resulting in a 6-bit MsCode having a quantization error of 1000/64=15.625 ms.

In embodiments, the NCS 102 may embed the encoded millisecond data in otherwise unused or zeroed bits of the PDU 300. For example, the PDU 300a may be implemented similarly to the PDU 300, except that the encoded millisecond data 312 is embedded in an otherwise unused code field 314 of the PDU 300a.

In some embodiments, the encoded millisecond data 312 may be embedded in other zero-bit or unused fields of the PDU 300a, e.g., within the sync-offset data 306.

Figure 4:
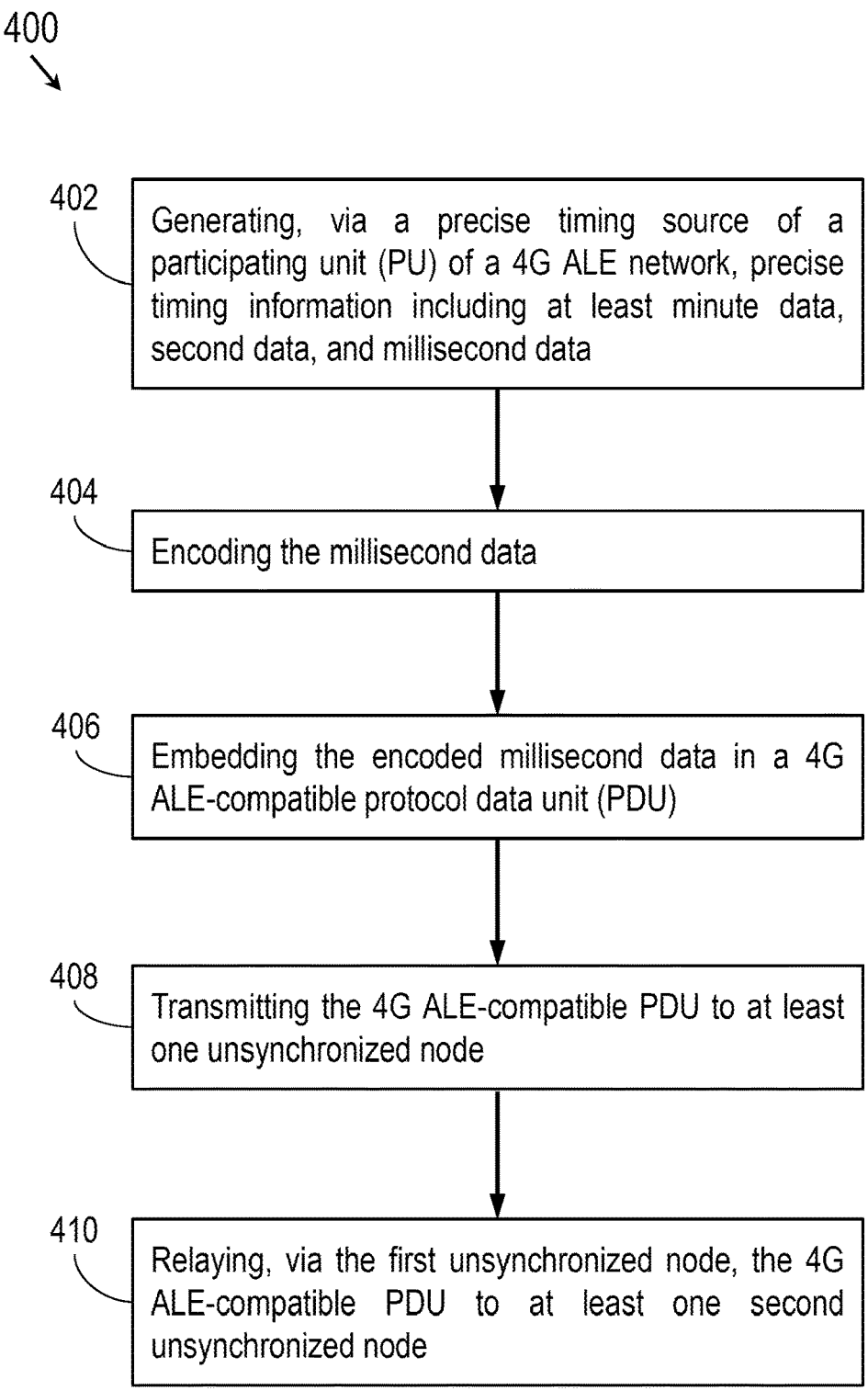
FIG. 4 is a flow diagram illustrating a method for precise time synchronization in a 4G ALE network in accordance with example embodiments of this disclosure.

Referring now to FIG. 4, the method 400 may be implemented by the 4G ALE network 100 and may include the following steps.

At a step 402, a precise timing source of a network control station (NCS) or other participating unit (PU) of the 4G ALE network generates precise timing information including minute data, second data, and millisecond data. For example, the precise timing information may be based on satellite positioning signals, e.g., received by a GPS receiver or associated with other satellite-based navigational systems. The precise timing information may be based on an onboard atomic clock or similar precise timing source. In some embodiments, e.g., within GPS-denied areas, the precise timing information may be based on a relative time.

At a step 404, the millisecond data is encoded.

At a step 406, the encoded millisecond data is embedded in a 4G ALE-compatible protocol data unit (PDU). For example, the encoded millisecond data may be embedded in a time-of-day response (TOD RESP) PDU.

At a step 408, the NCS/PU transmits the 4G ALE-compatible PDU to an unsynchronized PU of the 4G ALE network.

The method 400 may include an additional step 410. At the step 410, an unsynchronized PU receiving the 4G ALE-compatible PDU (and synchronizing itself thereto) may relay the 4G ALE-compatible PDU to other unsynchronized nodes of the 4G ALE network.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A communications node for a fourth-generation (4G) Automatic Link Establishment (ALE) network, comprising:
a precise timing source configured to generate timing information, the timing information comprising minute data, second data, and millisecond data;
and
a transmitter capable of transmitting and receiving over a frequency range from at least 2 MHz to 30 MHz, the transmitter configured to:
encode the millisecond data;
embed the encoded millisecond data in at least one 4G ALE-compatible Time-of-Day Response (TOD RESP) protocol data unit (PDU);
and
transmit the 4G ALE-compatible TOD RESP PDU to at least one unsynchronized node of the 4G ALE network.

2. The communications node of claim 1, wherein the precise timing source includes an atomic clock.

3. The communications node of claim 1, wherein the precise timing source includes a satellite-based position receiver configured to generate absolute timing information based on at least one received satellite signal.

4. The communications node of claim 1, wherein the timing information corresponds to a relative time.

5. The communications node of claim 1, wherein the communications node is selected from a group including a mobile platform and a manpack.

6. The communications node of claim 1, wherein the communications node is a network control station (NCS) of the 4G ALE network.

7. A method for precise time synchronization in a fourth-generation (4G) automatic link establishment (ALE) network, the method comprising:
generating, via a participating unit (PU) of a 4G ALE network, precise timing information including at least minute data, second data, and millisecond data;
encoding the millisecond data;
embedding the encoded millisecond data in a 4G ALE-compatible Time-of-Day Response (TOD RESP) protocol data unit (PDU);
and
transmitting the 4G ALE-compatible TOD RESP PDU to at least one unsynchronized node.

8. The method of claim 7, wherein generating, via a master node of a 4G ALE network, precise timing information includes:

generating, via a satellite-based position receiver of the master node, absolute timing information based on at least one received satellite signal.

9. The method of claim 7, wherein generating, via a master node of a 4G ALE network, precise timing information includes:

generating the precise timing information via an atomic clock of the master node.

10. The method of claim 7, wherein generating, via a master node of a 4G ALE network, precise timing information includes:

generating the precise timing information based on a relative time corresponding to the master node.

11. The method of claim 7, wherein the at least one unsynchronized node is a first unsynchronized node, further comprising:

relaying, via the first unsynchronized node, the ALE-compatible TOD RESP PDU to at least one second unsynchronized node.

\* \* \* \* \*